US006976061B1

(12) United States Patent
Sharma

(10) Patent No.: US 6,976,061 B1
(45) Date of Patent: Dec. 13, 2005

(54) RESOURCE ADAPTER AND XML DESCRIPTOR FOR USE IN A CLIENT SERVER ENVIRONMENT UTILIZING AN ENTERPRISE INFORMATION SYSTEM

(75) Inventor: Rahul Sharma, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/577,188

(22) Filed: May 24, 2000

(51) Int. Cl.$^7$ .............................................. G06F 15/16

(52) U.S. Cl. .................................................... 709/220

(58) Field of Search ............................. 709/223, 226, 709/218, 220

(56) References Cited

U.S. PATENT DOCUMENTS

| 5,282,273 | A | * | 1/1994 | Ushio et al. ................ 709/218 |
| 5,369,570 | A | * | 11/1994 | Parad ......................... 709/226 |
| 5,581,764 | A | * | 12/1996 | Fitzgerald et al. ........... 709/223 |
| 6,453,348 | B1 | * | 9/2002 | Barnier et al. ............... 709/225 |
| 6,466,654 | B1 | * | 10/2002 | Cooper et al. ............ 379/88.01 |
| 6,487,208 | B1 | * | 11/2002 | Chirashnya et al. ......... 370/400 |
| 6,499,036 | B1 | * | 12/2002 | Gurevich ................ 707/103 R |
| 6,530,080 | B2 | * | 3/2003 | Fresko et al. ................ 717/166 |
| 6,687,745 | B1 | * | 2/2004 | Franco et al. ................ 709/219 |
| 6,721,777 | B1 | * | 4/2004 | Sharma ....................... 718/101 |

OTHER PUBLICATIONS

BEA Systems, "BEA WebLogic Enterprise—Getting Started," WebLogic Enterprise 5.0, Document Edition 5.0 (Dec. 1999) <http://edocs.bea.com/wle/wle50/pd/getstart.pdf>.

Shannon, "Java ™ 2 Platform Enterprise Edition Specification, vl.2," (Dec. 1999) <http://java.sun.com/j2ee/docs.html>.

* cited by examiner

Primary Examiner—David Y. Eng
(74) Attorney, Agent, or Firm—Martine Penilla & Gencarella, LLP

(57) ABSTRACT

A resource adapter for use in client server computer configurations utilizing enterprise information systems is disclosed. The file format defines the contract between a connector provider and deployer. A packaged resource adapter includes Java classes and interfaces that are required for the implementation of both connector contracts and functionality of the resource adapter; utility Java classes for the resource adapter; native libraries required by the resource adapter; and any help files and documentation and descriptive meta information that ties all of the above elements together. In the preferred embodiment, the resource adapter is packaged using the Java ARchive (JAR) format in to an resource adapter archive (RAR). For example, a resource adapter for EIS A can be packaged as an archive with a filename eisA.rar. The RAR file is structured as a hierarchical directory including a deployment descriptor, a directory containing Java interfaces, implementation and utility classes as required by the resource adapter, and a directory containing any native libraries used by the resource adapter. Any platform dependent libraries are in this directory.

10 Claims, 4 Drawing Sheets

RESOURCE ADAPTER AND XML DESCRIPTOR FOR USE IN A CLIENT SERVER ENVIRONMENT UTILIZING AN ENTERPRISE INFORMATION SYSTEM

FIELD

The present relates broadly to computer systems having a client server configuration. Specifically, the present invention relates to resource adapters used in client server applications. More specifically still, the present invention relates to the packaging of resource adapters in client server applications.

BACKGROUND

An enterprise information system (EIS) provides an information infrastructure to an enterprise in a client-server computer system configuration. An EIS offers a set of services to its clients. These services are exposed to clients as local and/or remote interfaces. A resource manager is a software module that manages a set of shared EIS resources. For example, a transactional resource manager can participate in transactions that are externally controlled and coordinated by a transaction manager.

A resource adapter is a system level software driver provided along with an EIS connector and is specific to an underlying EIS. A resource adapter is used by an application server or an application client to connect to the EIS. The resource adapter plugs into an application server and collaborates with the application server to provide the underlying mechanisms-transactions, security, and connection pooling.

There is currently no existing standard mechanism for deploying and configuring resource adapters in a managed application server environment. Each vendor has its own specific mechanism, making it difficult to achieve off-the-shelf pluggability of resource adapters in an application server. For application developers who design and implement application servers, the result is an enormous amount of duplicated or nearly duplicated effort expended to customize resource adapters into a specific client server configuration.

There is a need for a method of packaging a resource adapter in a client server environment such that the resource adapter is easily ported to different systems and applications.

SUMMARY

The present invention provides a standardized format by which resource adapters may be packaged in client server computer configurations utilizing enterprise information systems. The file format defines the contract between a connector provider and deployer. A packaged resource adapter includes Java classes and interfaces that are required for the implementation of both connector contracts and functionality of the resource adapter; utility Java classes for the resource adapter; native libraries required by the resource adapter; and any help files and documentation and descriptive meta information that ties all of the above elements together. In the preferred embodiment, the resource adapter is packaged using the Java ARchive (JAR) format in to an resource adapter archive (RAR). For example, a resource adapter for EIS A can be packaged as an archive with a filename eisA.rar. The RAR file is structured as a hierarchical directory including a deployment descriptor, a directory containing Java interfaces, implementation and utility classes as required by the resource adapter, and a directory containing any native libraries used by the resource adapter. Any platform dependent libraries are in this directory.

DETAILED DESCRIPTION

The present invention specifies requirements for packaging and deploying of a resource adapter. These requirements support a modular and portable deployment of a resource adapter into a J2EE compliant application server.

Figure 1:
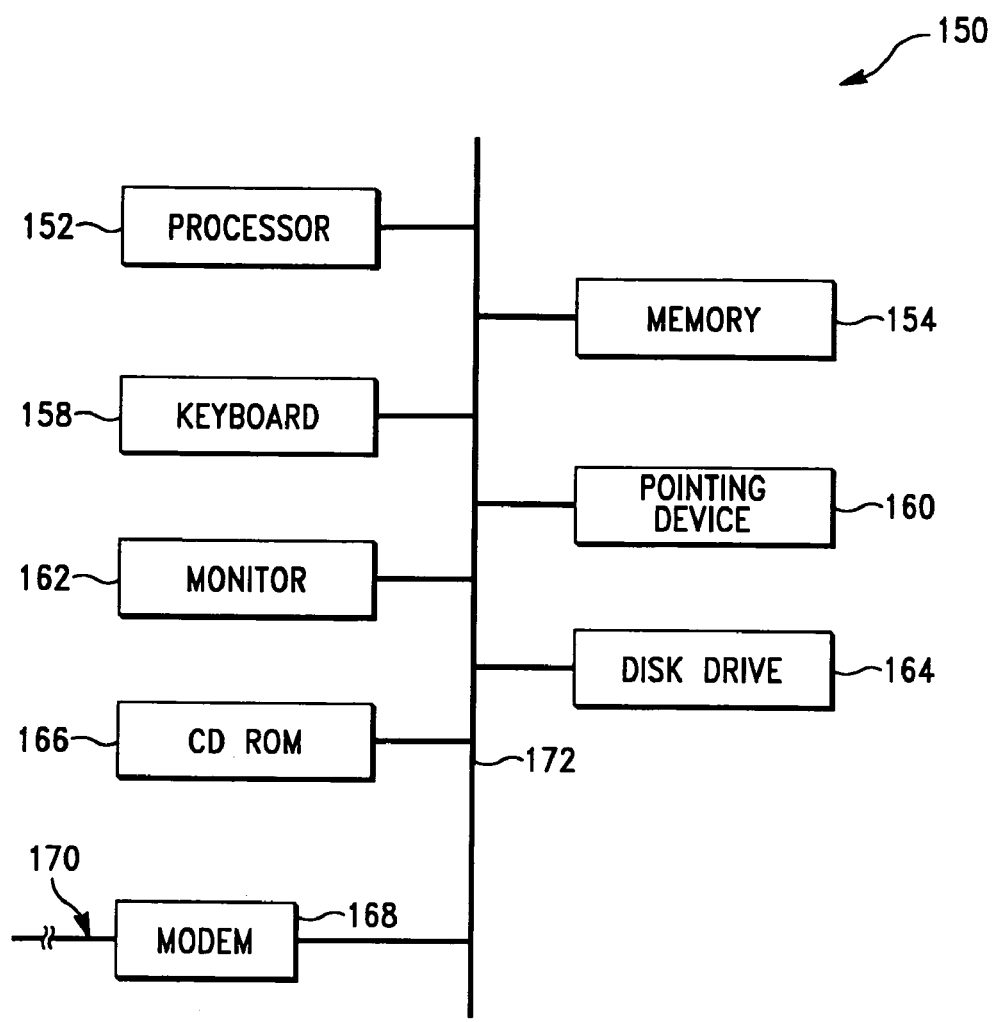
FIG. 1 is a high level block diagram of the major components utilized in a computer system according to the present invention.
Figure 2:
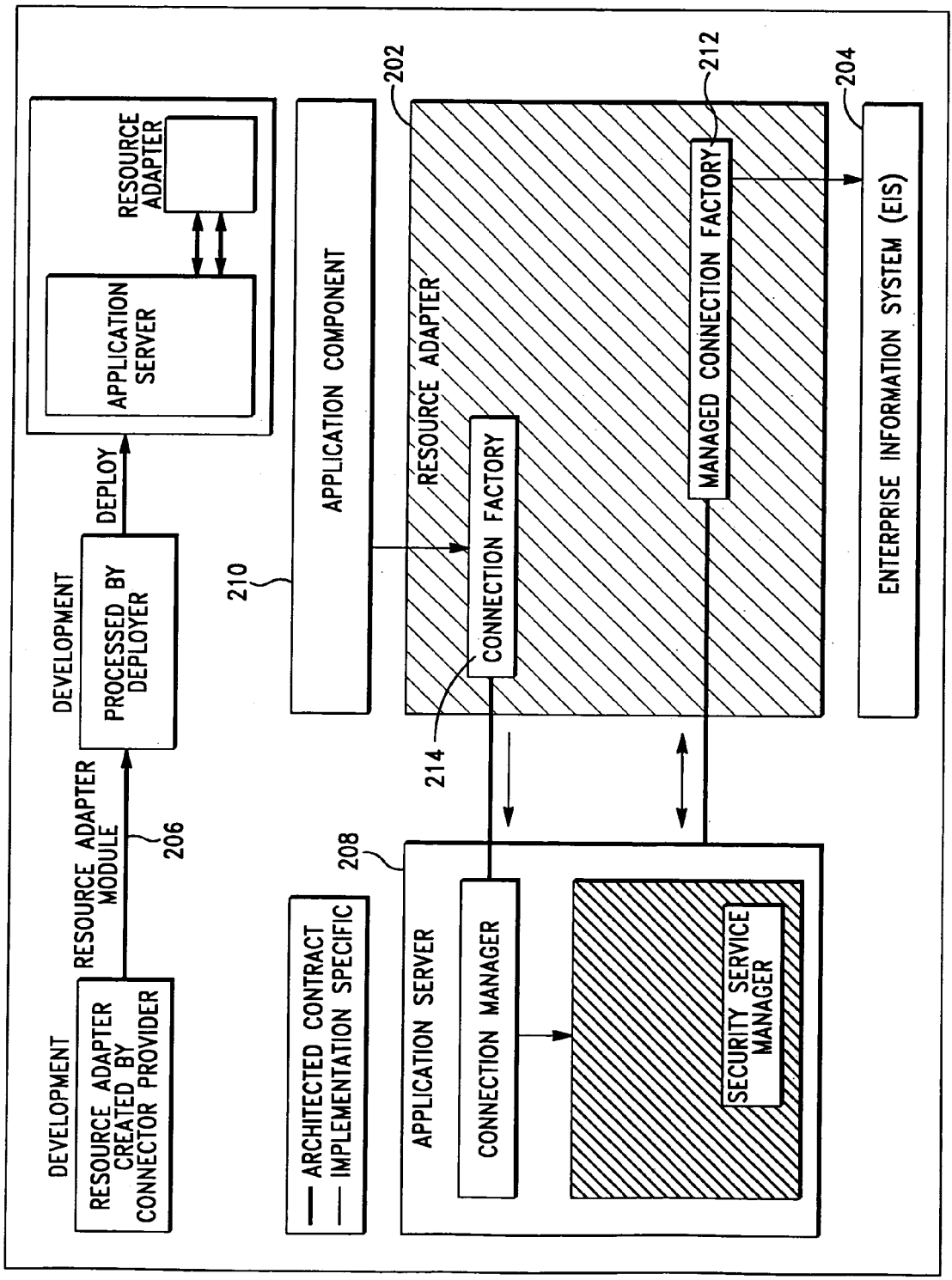
FIG. 2 is a high level block diagram of the major software components utilized in a client server computer environment incorporating an enterprise information system.

FIG. 1 is a high level block diagram of the hardware typically used in an embodiment of the present invention. Computer 150 incorporates a processor 152 utilizing a central processing unit (CPU) and supporting integrated circuitry. Memory 154 may include RAM and NVRAM such as flash memory, to facilitate storage of software modules executed by processor 152. Also included in computer 150 are keyboard 158, pointing device 160, and monitor 162, which allow a user to interact with computer 150 during execution of software programs. Mass storage devices such as disk drive 164 and CD ROM 166 may also be in computer 150 to provide storage for computer programs and associated files. Computer 150 may communicate with other computers via modem 168 and telephone line 170 to allow the computer 150 to be operated remotely, or utilize files stored at different locations. Other media may also be used in place of modem 168 and telephone line 170, such as a direct connection or high speed data line. The components described above may be operatively connected by a communications bus 172.

Overview

A connector provider develops a set of Java interfaces/classes as part of its implementation of a resource adapter 202. These Java classes implement connector architecture specified contracts and implement EIS specific functionality provided by the resource adapter 202. The development of a resource adapter 202 can also require use of native libraries that are specific to the underlying EIS 204. The Java interfaces/classes are then packaged together (with required native libraries, help files, documentation and other resources) with a deployment descriptor to create a Resource Adapter Module 206. A deployment descriptor defines the contract between a connector provider and deployer for the deployment of a resource adapter 202.

A resource adapter module 206 corresponds to a J2EE module in terms of the J2EE composition hierarchy. A J2EE module represents the basic unit of composition of a J2EE application. Examples of J2EE modules include: EJB module, application client module, web client module. A resource adapter module 206 can be deployed either directly into an application server 208 as a stand alone unit, or with a J2EE application that consists of one or more J2EE modules in addition to a resource adapter module 206. The J2EE specification specifies requirements for the assembly and packaging of J2EE applications. The stand alone deployment of a resource adapter module 206 into an application server 208 is typically done to support scenarios in which multiple J2EE applications share a single resource adapter module. However in certain scenarios, a resource adapter module 206 will only be required by components within a single J2EE application. The deployment option of resource adapter module 206 bundled with a J2EE application supports the latter scenario. During the deployment, the deployer installs a resource adapter module 206 in an application server 208 and then configures it in the target operational environment.

Packaging

Figure 3:
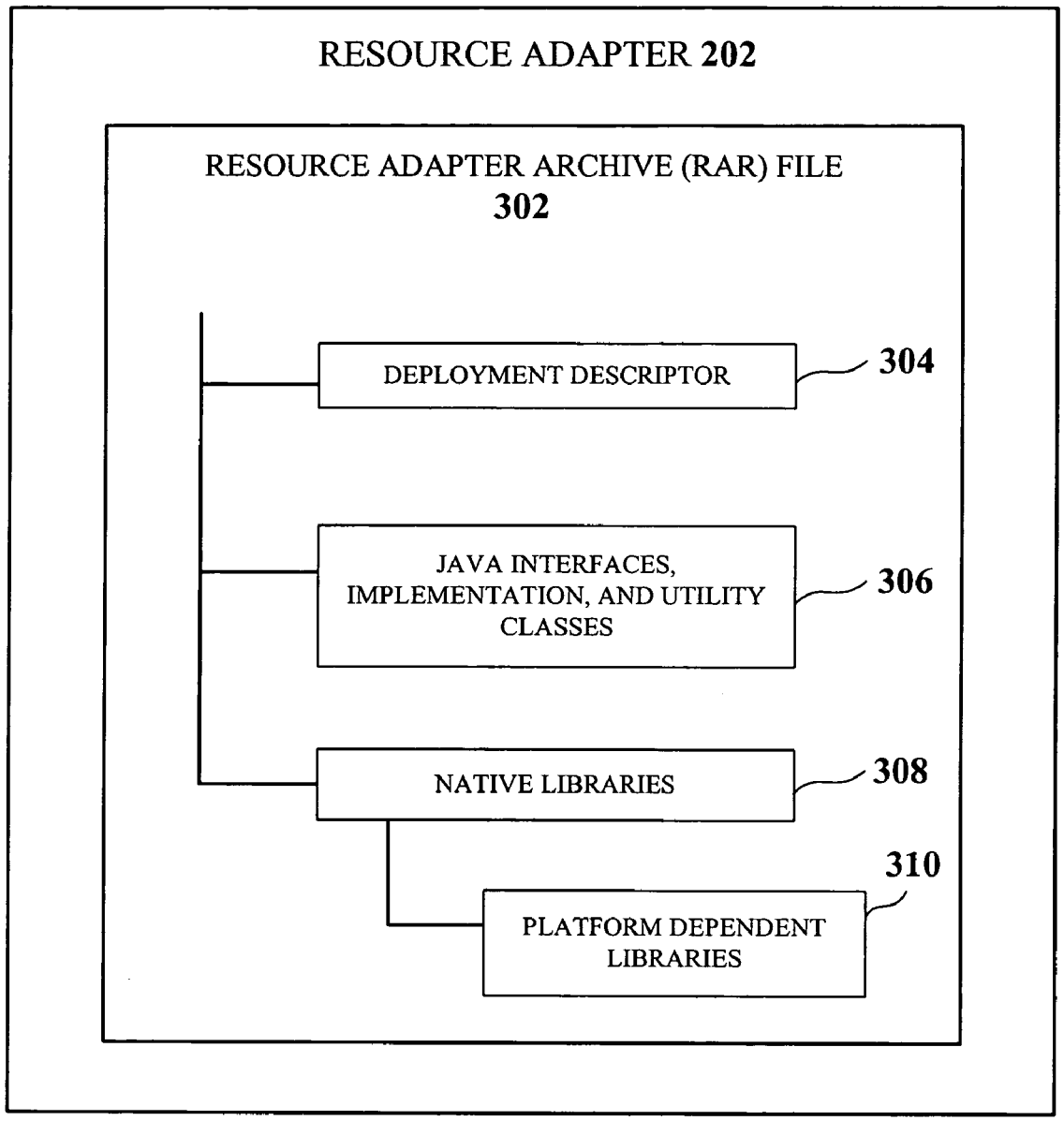
FIG. 3 is a simplified block diagram of a file format for packaged resource adapter 202, in accordance with one embodiment of the present invention.

FIG. 3 is a simplified block diagram of a file format for packaged resource adapter 202, in accordance with one embodiment of the present invention. The file format for a packaged resource adapter 202 defines the contract between a connector provider and deployer. A packaged resource adapter 202 includes Java classes and interfaces that are required for the implementation of both connector contracts and functionality of the resource adapter 202; utility Java classes for the resource adapter 202; native libraries required by the resource adapter 202; and any help files and documentation and descriptive meta information that ties all of the above elements together. In the preferred embodiment, a resource adapter 202 is be packaged using the Java Archive (JAR) format into an resource adapter archive (RAR) 302. For example, a resource adapter for EIS A can be packaged as an archive with a filename eisA.rar. The RAR file is structured as a hierarchical directory as follows. /RA-INF/ra.xml is a deployment descriptor 304. /RA-INF/classes/* is a directory 306 containing Java interfaces, implementation and utility classes as required by the resource adapter 202. /RA-INF/native-lib/* is a directory 308 containing any native libraries used by the resource adapter 202. Any platform dependent libraries 310 are in this directory.

The RAR file contains a deployment descriptor based on the format specified in the section. The deployment descriptor is stored with the name RA-INF/ra.xml in theRAR file. A resource adapter packaged as a RAR file contains a META-INF directory that contains information useful to the Java Archive tools.

Deployment

A deployment descriptor defines the contract between a connector provider and deployer. It captures the declarative information that is intended for the deployer for deployment of a resource adapter in a target operational environment. A resource adapter module 206 is deployed based on the deployment requirements specified by the connector provider through the deployment descriptor.

Figure 4:
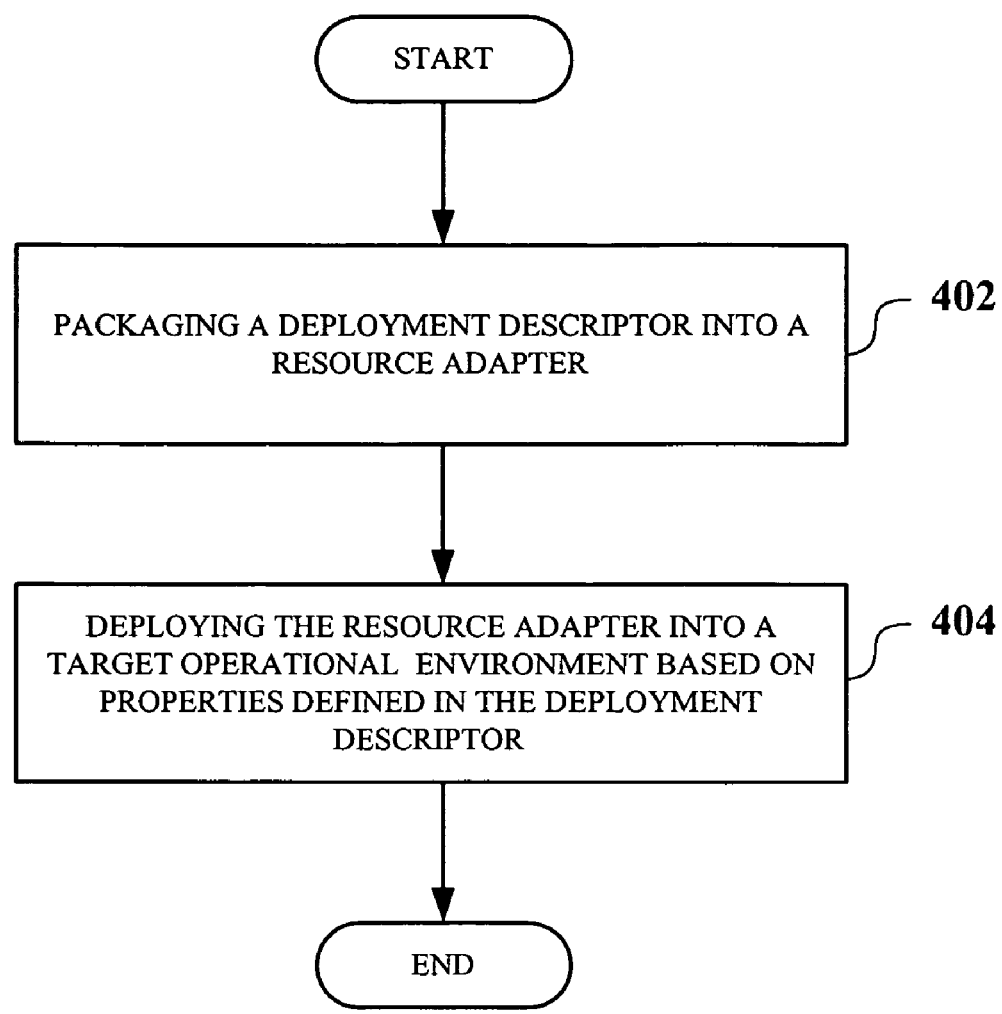
FIG. 4 is a flowchart diagram illustrating a high level overview of the method operations to provide a resource adapter, in accordance with one embodiment of the present invention.

FIG. 4 is a flowchart diagram illustrating a high level overview of the method operations to provide a resource adapter, in accordance with one embodiment of the present invention. Starting at operation 402, a deployment descriptor is packaged into the resource adapter. Interfaces, implementation classes, utility classes, native libraries, and descriptive meta information are also packaged into the resource adapter. Thereafter, in operation 404, resource adapter is deployed into a target operational environment based on properties defined in the deployment descriptor. As will be explained in more detail below, deployment of the resource adapter into the target operational environment includes configuring the resource adapter in the target operational environment to create a connection to an instance of an EIS, configuring application server mechanisms for transaction management, and configuring security in the target operational environment.

Connector Provider's Responsibility

The connector provider specifies the deployment descriptor for a resource adapter 202. The connector provider specifies general information about a resource adapter, such as the name of the resource adapter, a description of the resource adapter, a URI of a UI icon for the resource adapter, and the identity of the vendor who provides the resource adapter. The connector provider can also specify the type of EIS system, such as the name of a specific database, ERP system, etc. Additionally, the connector provider can specify the version of the connector specification (represented as a string) supported by the resource adapter, as well as the version of the resource adapter, also represented as a string.

The connector provider also specifies the fully qualified name of the Java class that implements the javax.resource.ManagedConnectionFactory interface, as well as the fully qualified name of the Java interface and implementation class for the connection factory. The connector provider specifies the fully qualified name of the Java interface and implementation class for the connection interface. The connector provider specifies the level of transaction support provided by the resource adapter implementation. The level of transaction support can be any one of the following: no_transaction, local_transaction or xa_transaction. Note that this support is specified for a resource adapter and not for the underlying EIS instance. no_transaction indicates that the resource adapter 202 does not support either resource manager local or JTA transactions. It does not implement either XAResource or LocalTransaction interfaces.

local_transaction indicates that the resource adapter 202 supports resource manager local transactions by implementing the LocalTransaction interface.

xa_transaction indicates that the resource adapter 202 supports both resource manager local and JTA transactions by implementing the LocalTransaction and XAResource interfaces respectively.

The connector provider specifies name, type, description and an optional default value for the properties that have to be configured on a per ManagedConnectionFactory instance. Each ManagedConnectionFactory instance creates connections to a specific EIS instance based on the properties configured on the ManagedConnectionFactory instance. The configurable properties are specified only once in the deployment descriptor, even though a resource adapter 202 can be used to configure multiple ManagedConnnectionFactory instances (that create connections to different instances of the same EIS). For example, a deployment tool can create multiple copies of XML based deployment descriptor; each copy of the deployment descriptor carries a specific configuration of properties for a ManagedConenctionFactory.

Authentication Mechanism

The connector provider specifies all the authentication mechanisms that are supported by the resource adapter 202. This relates to the support provided by the resource adapter 202 implementation but not by the underlying EIS instance. The standard values are: basicpassword and kerbv5. The resource adapter 202 can support one or more of these authentication mechanisms. Basicpassword is a user password based authentication mechanism that is specific to an EIS Kerbv5 is a Kerberos version 5 based authentication mechanism. If there is no authentication mechanism specified as part of the deployment descriptor, the resource adapter 202 does not support any standard security authentication mechanisms as part of security contract.

The connector provider specifies whether resource adapter 202 supports reauthentication of an existing physical connection. The security permission listed in the deployment descriptor are different from those required by the default permission set. The deployment descriptor specified by the connector provider for its resource adapter is consistent with the XML document type description (DTD) as specified below.

Deployer Responsibilities

The deployer is responsible for using a deployment tool to configure a resource adapter 202 in a target operational environment. The configuration of a resource adapter 202 is based on the properties defined in the deployment descriptor as part of the resource adapter module 206. The deployer performs the following tasks to configure a resource adapter 202.

The deployer configures one or more property sets (per ManagedConnectionFactory instance) for creating connections to various underlying EIS instances. The deployer creates a property set by using a deployment tool to set valid values for various configurable fields. The configuration of each field is based on the name, type and description of the field specified in the deployment descriptor.

Each property set represents a specific configuration for creating connections to a specific EIS instance. Since a resource adapter 202 can be used to create connections to multiple instances of the same EIS, there can be multiple property sets (one for each configured instance of the object ManagedConnectionFactory) for a single resource adapter 202.

The deployer also configures application server 208 mechanisms for transaction management based on the level of transaction support specified by the resource adapter 202. Additionally, the deployer configures security in the target operational environment based on the security requirements specified by the resource adapter 202 in its deployment descriptor. During deployment, the deployer can check whether or not an underlying EIS instance supports the same capabilities such as transaction support and authentication mechanisms as the corresponding resource adapter 202. For example, if a resource adapter 202 provides implementation support for Kerberos based authentication but the underlying EIS instance does not support Kerberos, then the deployer can decide not to configure Kerberos for authentication to this EIS instance. However if the deployer does not perform such checks during deployment, any misconfigura-tions should lead to runtime exceptions.

Application Server Responsibilities

An application server 208 provides a deployment tool that supports deployment of multiple resource adapters. A deployment tool can also be provided by third party enterprise tools vendors. A deployment tool is capable of reading the deployment descriptor from a resource adapter module 206. It enables the deployer to configure a resource adapter 202 in the operational environment and thereby reflect the values of all properties declared in the deployment descriptor for the resource adapter 202. A deployment tool supports management of multiple property sets (one per configured ManagedConnectionFactory instance) for a resource adapter 202. This includes support for adding or removing a property set from the configuration for a resource adapter 202.

A deployment tool supports addition and removal of resource adapters from an operational environment. An application server 208 uses the deployment properties about the capabilities of a resource adapter 202 (for example, support level for transactions) to provide different QoS for a configured resource adapter 202 and its underlying EIS. The preferred embodiment of the present invention incorporates the following interfaces and classes.

ManagedConnectionFactory

The class that implements ManagedConnectionFactory 212 interface supports a set of properties that provide information required by the ManagedConnectionfactory 212 for the creation of physical connections to the underlying EIS. A resource adapter 202 can implement the ManagedConnectionFactory 212 interface as a Java Bean. As a Java Bean implementor, the resource adapter 202 can also provide a BeanInfo class that implements the java.beans.BeanInfo interface and provides explicit information about the methods and properties supported by the ManagedConnectionFactory implementation class. The implementation of ManagedConnectionFactory 212 as a Java Bean improves the tool ability (for tools that are based on the JavaBeans framework) for the configuration of ManagedConnectionFactory instances. In the preferred embodiment, the deployment tool uses an XML based deployment descriptor to find out the set of configurable properties for a ManagedConnectionFactory 212. A deployment descriptor for a resource adapter 202 specifies name, type, description and default value of the configurable properties.

Properties Conventions

The ManagedConnectionFactory implementation class provides getter and setter methods for each of its supported properties. The supported properties are consistent with the specification of configurable properties specified in the deployment descriptor. The getter and setter methods convention are based on Java Beans design pattern. These methods are defined on the implementation class and not on the ManagedConnectionFactory interface 212. The reason for this requirement is to keep ManagedConnectionfactory interface 212 independent of any resource adapter or EIS specific properties.

Standard Properties

The connector architecture identifies a standard set of properties common across various types of resource adapters and EISs. A resource adapter 202 is not required to support a standard property if that property does not apply to its configuration. These standard properties include the name of the server for the EIS instance, the port number for establishing connection to an EIS instance, name of the user establishing connection to an EIS instance, password for the user establishing connection, and the URL for the EIS instance to which to connect.

In addition to these standard properties, a ManagedConnectionFactory implementation class can support properties that are specific to a resource adapter and its underlying EIS. All the properties are administered by the deployer and are not visible to an application component provider. It is required that the specified properties be bound within specific limits or be restricted to well defined values. In the XML deployment descriptor, any bounds or well defined values of properties are described in the description element.

JNDI Configuration and Lookup

In both managed and nonmanaged application scenarios, an application component 210 (or application client) looks up a connection factory instance in the component's environment using the Java Naming and Directory Interface (JNDI). The application component 210 then uses the connection factory instance to get a connection to the underlying EIS. The following code extract example shows the JNDI lookup of a javax.resource.cci.ConnectionFactory instance.

```
// Application Component/Client Code
obtain the initial JNDI context
Context initctx=new InitialContext( );
// perform JNDI lookup to obtain connection factory javax.
    resource.cci.ConnectionFactory cxf= (javax.resource.cci.
    ConnectionFactory)initctx.lookup("java:comp/env/eis/
    MyEIS");
javax.resource.cci.Connection cx=cxf.getconnection( );
```

In both managed or nonmanaged environment, registration of a connection factory 214 instance in the JNDI namespace can be performed by using either JNDI Reference or Serializable mechanism. The choice between the two JNDI mechanisms depends on whether the JNDI provider being used supports specific mechanism, whether the application server 208 and resource adapter 202 provide the necessary support as specified in the respective requirements, and any constraints on the size of serialized objects that can be stored in the JNDI namespace. The reference mechanism allows for only a reference to the actual object to be stored in the JNDI namespace. This is preferable to the serializable mechanism that stores the whole serialized object in the namespace.

Deployer

The deployer is responsible for configuring connection factory instances in the JNDI environment. The deployer manages the JNDI namespace such that the same programming model for JNDI based connection factory lookup is supported in both managed and nonmanaged environments.

Resource Adapter

The implementation class for a connection factory interface is required to implement the java.io.Serializable interface to support JNDI registration. An implementation of javax.naming. Referenceable interface by connection factory class is only required if the connection factory 214 supports Reference mechanism-based JNDI registration. The ManagedConnectionFactory implementation class is required to implement the java.io.Serializable interface. To support Reference mechanism in a nonmanaged environment, a resource adapter or a helper class is utilized to provide an implementation of the javax.naming.spi.ObjectFactory interface.

Application Server

The implementation class for javax.resource.ConnectionManager is required to implement java.io.Serializable interface. If an application server 208 supports JNDI Reference mechanism based connection factory lookup, it is required to provide an implementation class for javax.naming.spi.ObjectFactory interface. The implementation of this interface is application server specific.

In a serializeable scenario, The implementation classes for both javax.resource.-cci.ConnectionFactory and javax.resource.ManagedConnectionFactory interfaces implement java.io.Serializable interface. The deployment code retrieves the configuration properties from the XML deployment descriptor for the resource adapter 202. The deployment code then creates an instance of ManagedConnectionFactory implementation class and configures properties on the instance. An example appears below:

```
// Deployment Code
// Create an instance of ManagedConnectionFactory imple-
    mentation class com.myeis.ManagedConnectionFac-
    toryImpl mcf= new com.myeis.ManagedConnectionFac-
    toryImpl( );
// Set properties on ManagedConnectionFactory instance
// Note: Properties are defined on the implementation class
    and not on the
//javax.resource.ManagedConnectionFactory interface
mcf.setServerName(" . . . ");
mcf.setPortNumber(" . . . . ");
. . .
```

In a non-managed environment, an application developer writes the deployment code. While in a managed environment, the deployment code is typically hidden by a deployment tool. The deployment code uses the ManagedConnectionFactory instance to create a connection factory instance. The code then registers the connection factory instance in the JNDI namespace.

```
// Deployment Code
// In managed environment, create a ConnectionManager
    specific to
// the application server. Note that in a nonmanaged envi-
    ronment,
// ConnectionManager is specific to the resource adapter.
com.wombatserver.ConnectionManager cm= new com.
    wombatserver.ConnectionManager( . . . );
// Create an instance of connection factory
Object cxf=mcf.createConnectionFactory(cm);
// Get JNDI context
javax.naming.Context ctx=new javax.naming.InitialContext
    (env);
// Bind to the JNDI namespace specifying a factory name
ctx.bind(" . . . ", cxf);
```

When an application component 210 does a JNDI lookup of connection factory instance, the returned connection factory instance is associated with a configured ManagedConnectionFactory instance and a ConnectionManager instance. The implementation class for connection factory 214 achieves the association between these instances in an implementation specific manner. A JNDI configuration in a managed environment can be based on the Reference mechanism, using the CCI interfaces javax.resource.cci.ConnectionFactory and javax.resource.cci.Connection as connection factory 214 and connection interface, respectively.

Scenario: Referenceable

The implementation class for ConnectionFactory interface 214 implements the javax.naming. Referenceable as shown in the following code extract example.

```
public class com.myeis.ConnectionFactoryImpl implements
javax.naming.Referenceable,
java.io.Serializable,
javax.resource.cci.ConnectionFactory {
// Reference to this ConnectionFactory
javax.naming.Reference reference;
// setReference is called by deployment code
public void setReference(Reference ref) {
reference=ref;
}
// getReference is called by JNDI provider during Context-
    .bind
public Reference getReference( ) throws NamingException
{
return reference;
}
. . .
}
```

Note that the method setReference is not defined as part of the Referenceable interface.

An application server 208 provides a class (in an application server specific implementation) that implements the javax.naming.spi.ObjectFactory interface. In the ObjectFactory.getObject-Instance method, the information carried by the Reference parameter (as set in the Connection-FactoryImpl.setReference method) is used to lookup the property set to be configured on the target ManagedConnectionFactory instance. The mapping from a Reference instance to multiple configured property sets enables an application server 208 to configure multiple ManagedConnectionFactory instances with respective property sets. An application server 208 maintains the property set configuration in an implementation specific way based on the deployment descriptor specification.

The implementation and structure of Reference is specific to an application server 208. The following code extract shows an illustrative example of the ObjectFactory.getObjectInstance method.

```
public class com.wombatserver.Application-
    ServerJNDIHandler
implements javax.naming.spi.ObjectFactory {
// . . .
public Object getObjectInstance(Object obj, Name name,
    Context ctx, Hashtable env)
throws Exception {
javax.naming.Reference ref=(javax.naming.Reference)obj;
// Using the information carried by the Reference instance,
// (<referenceName, logicalName> in this example) lookup
// a configured property set and then configure a
// ManagedConnectionFactory instance with specified
// properties.
// . . . [implementation specific]
//
// For example: the instantiation of ManagedConnectionFactory
// implementation class and invocation of its setter method
// can be done using Java Reflection mechanism.
javax.resource.ManagedConnectionFactory mcf=// . . .
// create a Connection Manager instance specific to the
// application server
com.wombatserver.ConnectionManager cxManager=// . . .
// create a connection factory instance.
// The ConnectionManager instance provided by the application
// server gets associated with the created
// connection factory instance
return mcf.createConnectionFactory(cxManager);
}
. . .
}
```

The following deployment code example shows registration of a reference to a connection factory instance in the JNDI namespace:.// Deployment Code javax.naming.Context ctx=new javax.naming.InitialContext(env);
// Create an instance of connection factory
com.myeis.ConnectionFactoryImpl cf= new com.myeis.ConnectionFactoryImpl( );
// Create a reference for the ConnectionFactory instance
javax.naming.Reference ref=new javax.naming.Reference(
ConnectionFactoryImpl.class.getName( ),
new javax.naming.StringRefAddr(
"<referenceName>", "<logicalName>"),
ApplicationServerJNDIHandler.class.getName( ),
null);
cf. setReference(ref);
// bind to the JNDI namespace specifying a name for the connection factory
ctx.bind(" . . . ", cf);

The deployment code is designed as generic. The code dynamically creates an instance of connection factory 214, create a Reference instance and then set the reference. In the above code sample, the setReference method is implementation specific and is not defined as part of the Referenceable interface. The Context.bind method registers a Reference to the connection factory instance in the JNDI namespace.

Connection Factory Lookup

The following steps happen when an application component 210 calls the method JNDI Context. lookup to lookup a connection factory instance. First, the JNDI passes control to the application server 208 and the method ObjectFactory.getObjectInstance implemented by the application server 208 is called. The application server 208 then reates a new instance of ManagedConnectionFactory implementation class provided by the resource adapter 202. The application server 208 then calls setter methods on the ManagedConnectionFactory instance to set various configuration properties on this instance. These properties provide information that is required by the ManagedConnectionFactory instance to create physical connections to the underlying EIS. The application server 208 uses an existing property set (configured during the deployment of resource adapter) to set the required properties on the ManagedConnectionFactory instance.

After the newly created ManagedConnectionFactory instance has been configured with its property set, the application server 208 creates a new.ConnectionManager instance. The application server 208 then calls the method createConnectionFactory on the ManagedConnectionFactory instance (passing in the ConnectionManager instance from the previous step) to get a ConnectionFactory instance.

The application server 208 then returns the connection factory instance to the JNDI provider so that this instance can be returned as result of the JNDI lookup. The application component 210 gets the ConnectionFactory instance as a result of the JNDI lookup.

The XML DTD may be used for the deployment descriptor for resource adapter 202. The comments in the DTD specify additional requirements for the syntax and semantics that cannot be specified by the DTD mechanism. All valid resource adapter deployment descriptors contain the following DOCTYPE declaration:

<!DOCTYPE connector PUBLIC "//Sun Microsystems, Inc.//DTD Connector 1.0//EN""http://java.sun.com/j2ee/dtds/connector_1_0.dtd">

The root element of the deployment descriptor for a resource adapter is the connector. The content of the XML elements is usually case sensitive. A resource adapter (or an application server on behalf of resource adapter 202) can specify additional deployment information beyond the standard deployment descriptor. The additional information is stored in a separate file and refers to the standard deployment descriptor. Resource adapter 202 is not allowed to add any nonstandard information into a standard deployment descriptor.

The connector element is the root element of the deployment descriptor for the connector. This element includes general information vendor name, version, specification version supported, and icon related to the resource adapter module 206. It also includes information specific to the implementation of the resource adapter library as specified through the element resourceadapter, as shown in the following illustrative example.

>
<!ELEMENT connector (displayname, description?, icon?, vendorname, specversion, eistype, version, resourceadapter)>
<!

The element resourceadapter specifies information about the resource adapter 202 provided by the connector provider. The information includes fully qualified names of class/interfaces required as part of the connector architecture specified contracts, level of transaction support provided, configurable properties for ManagedConnectionFactory instance, one or more authentication mechanisms supported and additional required security permissions. If there is no authmechanism specified as part of resource adapter element the resource adapter 202 does not support any standard authentication mechanisms as part of security contract. An example of the resourceadapter element appears below.
>
<!ELEMENT resourceadapter (managedconnectionfactoryclass, connectionfactoryinterface, connectionfactoryimplclass, connectioninterface, connectionimpl class, transactionsupport, configproperty*, authmechanism*, reauthentication support, securitypermission*
)>
<!

The element authmechanism specifies an authentication mechanism supported by the resource adapter 202. Note that this support is for the resource adapter 202 and not for the underlying EIS instance. The optional description specifies any.resource adapter specific requirement for the support of security contract and authentication mechanism. An example of the authmechanism element appears below.
>
<!ELEMENT authmechanism (description?, authmechtype, credentialinterface+)>
<!

The element credentialinterface specifies the interface that the resource adapter implementation supports for the representation of the security credentials. This element is used by application server 208 to find out the Credential interface it should use as part of the security contract. The possible values are:
<credentialinterface>javax.resource.security.PasswordCredential
</credentialinterface>
<credentialinterface>javax.resource.security.GenericCredential
</credentialinterface>
>
<!ELEMENT credentialinterface (#PCDATA)>
<!

The element authmechtype specifies type of an authentication mechanism. The possible values are:
<authmechtype>basicpassword</authmechtype>
<authmechtype>kerbv5</authmechtype>
>
<!ELEMENT authmechtype (#PCDATA)>
>!

The element connectionfactoryinterface specifies the fully qualified name of the ConnectionFactory interface supported by the resource adapter 202. An example appears below.
<connectionfactoryinterface>javax.resource.cci.ConnectionFactory
</connectionfactoryinterface>
>
<!ELEMENT connectionfactoryinterface (#PCDATA)>
<!

The element connectionfactoryimplclass specifies the fully qualified name of the ConnectionFactory class that implements resource adapter specific ConnectionFactory interface.
Example:
  <connectionfactoryimplclass>com.wombat.ConnectionFactoryImpl
  </connectionfactoryimplclass>
>
<!ELEMENT connectionfactoryimplclass (#PCDATA)>
<!

The element connectioninterface specifies the fully qualified name of the Connection interface supported by the resource adapter 202.
Example:
  <connectioninterface>javax.resource.cci.Connection
  </connectioninterface>
>.<!ELEMENT connectioninterface (#PCDATA)>
<!

The element connectionimplclass specifies the fully qualified name of the Connection class that implements resource adapter specific Connection interface.
Example:
  <connectionimplclass>com.wombat.ConnectionImpl
  </connectionimplclass>
>
<!ELEMENT connectionimplclass (#PCDATA)>
<!

The element configentry contains a declaration of a single configuration property for a ManagedConnectionFactory instance. Each ManagedConnectionFactory instance creates connections to a specific EIS instance based on the properties configured on the ManagedConnectionFactory instance. The configurable properties are specified only once in the deployment descriptor, even though a resource adapter 202 can be used to configure multiple ManagedConnectionFactory instances (that create connections to different instances of the same EIS). The declaration consists of an optional description, name, type and an optional value of the configuration property. If the connector provider does not specify a value than the deployer is responsible for providing a valid value for a configuration property. Any bounds or well defined values of properties are described in the description element. An example appears below.
>
<!ELEMENT configproperty (description?, configpropertyname, configproperty type, configpropertyvalue?)>
The element configpropertyname contains the name of a configuration property.
Example: <configpropertyname>ServerName</configpropertyname>
The connector architecture defines a set of well defined properties all of type java.lang.String.
These are as follows in the examples:
<configpropertyname>ServerName</configpropertyname>
<configpropertyname>PortNumber</configpropertyname>
<configpropertyname>UserName</configpropertyname>
<configpropertyname>Password</configpropertyname>
<configpropertyname>ConnectionURL</configpropertyname>
The connector provider can extend this property set to include properties specific to a resource adapter 202 and its underlying EIS.
>
<!ELEMENT configpropertyname (#PCDATA)>
<!

The element configpropertytype contains the fully qualifies Java type of a configuration property as required by ManagedConnectionFactory instance. The following are the legal values of configpropertytype: java.lang.Boolean, java.lang.String, java.lang.Integer, java.lang.Double, java.lang.Byte, java.lang.Short, java.lang.Long, java.lang.Float
Example: <configpropertytype>java.lang.String</configpropertytype>
>
<!ELEMENT configpropertytype (#PCDATA)>
<!
The element configpropertyvalue contains the value of a configuration entry.
Example: <configpropertyvalue>WombatServer</configpropertyvalue>
>
<!ELEMENT configpropertyvalue (#PCDATA)>
<!
The element displayname contains a short name for the connector that is intended to be displayed by the tools.
>
<!ELEMENT displayname (#PCDATA)>
<!
The element description is used by connector provider to provide text describing the parent element. The description element includes any information that the connector provider wants to provide to the deployer. Typically tools used by the consumer of resource adapter module 206 will display the description when processing the parent element.
>
<!ELEMENT description (#PCDATA)>
<!
The element eistype contains information about the type of the EIS. For example, the type of an EIS can be product name of EIS independent of any version info. This helps in identifying EIS instances that can be used with this resource adapter.
>
<!ELEMENT eistype (#PCDATA)>
<!
The icon element contains the name of a file containing an icon image for the resource adapter module 206. The file name is relative path within the resource adapter module 206. This file is be either in JPEG or GIF format. The icon is used by tools to display information about the resource adapter module 206.
Example
<icon>lib/images/wombatadapter.jpg</icon>
>
<!ELEMENT icon (#PCDATA)>
<!
The element managedconnectionfactoryclass specifies the fully qualified name of the Java class that implements the javax.resource.ManagedConnectionFactory interface. This Java class is provided as part of resource adapter's implementation of connector specified contracts.
Example
<managedconnectionfactoryclass>com.wombat.ManagedConnectionFactoryImpl.</managedconnectionfactoryclass>
>
<!ELEMENT managedconnectionfactoryclass (#PCDATA)>
The element reauthenticationsupport specifies whether the resource adapter 202 implementation supports reauthentication of existing ManagedConnection instance. Note that this information is for the resource adapter 202 implementation and not for the underlying EIS instance. This element is one of the following:
<reauthenticationsupport>true</reauthenticationsupport>
<reauthenticationsupport>false</reauthenticationsupport>
>
<!ELEMENT reauthenticationsupport (#PCDATA)>
<!
The element specversion specifies the version of the connector architecture specification that is supported by this resource adapter 202. This information enables deployer to configure the resource adapter 202 to support deployment and runtime requirements of the corresponding connector specification.
Example
<specversion>1.0</specversion>
>
<!ELEMENT specversion (#PCDATA)>
<!
The element securitypermission specifies a security permission that is required by the resource adapter code. The security permission listed in the deployment descriptor are ones that are different from those required by the default permission set as specified in the connector specification. The optional description can mention specific reason that resource adapter 202 requires a given security permission.
>
<!ELEMENT securitypermission (description?, securitypermissionspec)>
<!
The element securitypermissionspec specifies a security permission based on the Security policy file syntax.
Example: http://java.sun.com/products/jdk/1.2/docs/guide/security/PolicyFiles.html#FileSyntax
>
<!ELEMENT securitypermissionspec (#PCDATA)>
<!
The transactionsupport element specifies the level of transaction support provided by the resource adapter. The value of transactionsupport is one of the following:
<transactionsupport>no_transaction</transactionsupport>
<transactionsupport>local_transaction<transactionsupport>
<transactionsupport>xa_transaction</transactionsupport>
>
<!ELEMENT transactionsupport (#PCDATA)>.<!
The element vendorname specifies the name of connector provider vendor.
Example
<vendorname>Wombat Corp.</vendorname>
>
<!ELEMENT vendorname (#PCDATA)>
The element version specifies a string based version of the resource adapter 202 from the connector provider.
Example
<version>1.0</version>
<!ELEMENT version (#PCDATA)>
<!
The ID mechanism allows tools that produce additional deployment information (beyond the standard deployment descriptor) to store the nonstandard information in a separate file and to refer to standard deployment descriptor from these nonstandard tools specific file. Tools cannot add the nonstandard information into the standard deployment descriptor.
>
<!ATTLIST authmechanism id ID #IMPLIED>
<!ATTLIST authmechtype id ID #IMPLIED>
<!ATTLIST configproperty id ID #IMPLIED>
<!ATTLIST configpropertyname id ID #IMPLIED>
<!ATTLIST configpropertyvalue id ID #IMPLIED>
<!ATTLIST configpropertytype id ID #IMPLIED>
<!ATTLIST connector id ID #IMPLIED>
<!ATTLIST connectionfactoryinterface id ID #IMPLIED>
<!ATTLIST connectionfactoryimplclass id ID #IMPLIED>
<!ATTLIST connectioninterface id ID #IMPLIED>
<!ATTLIST connectionimplclass id ID #IMPLIED>
<!ATTLIST credentialinterface id ID #IMPLIED>
<!ATTLIST description id ID #IMPLIED>
<!ATTLIST displayname id ID #IMPLIED>
<!ATTLIST eistype id ID #IMPLIED>
<!ATTLIST icon id ID #IMPLIED>
<!ATTLIST managedconnectionfactoryclass id ID #IMPLIED>
<!ATTLIST reauthenticationsupport id ID #IMPLIED>
<!ATTLIST resourceadapter id ID #IMPLIED>
<!ATTLIST securitypermission id ID #IMPLIED>
<!ATTLIST securitypermissionspec id ID #IMPLIED>
<!ATTLIST specversion id ID #IMPLIED>
<!ATTLIST transactionsupport id ID #IMPLIED>
<!ATTLIST vendorname id ID #IMPLIED>

A resource adapter for use in a client server computer environment has been described and illustrated in detail. While there have been described above the principles of the present invention in conjunction with various embodiments, the foregoing description is made only by way of example and not as a limitation to the scope of the invention.

What is claimed is:

1. A method to provide a resource adapter that collaborates to provide connections with one of a plurality of application servers and an enterprise information system (EIS), which provides services offered by the EIS, comprising:
    packaging a deployment descriptor into the resource adapter; and
    deploying the resource adapter into a target operational environment based on properties defined in the deployment descriptor, the deploying including,
    configuring the resource adapter in the target operational environment to create a connection to an instance of the EIS,
    the connections of the target operational environment being defined between one of the application servers and the EIS.

2. The method of claim 1, wherein the deploying the resource adapter into the target operational environment based on properties defined in the deployment descriptor includes,
    configuring application server mechanisms for transaction management.

3. The method of claim 1, wherein the deploying the resource adapter into the target operational environment based on properties defined in the deployment descriptor includes,
    configuring security in the target operational environment.

4. The method of claim 1, wherein the packaging includes,
    packaging interfaces, implementation classes, utility classes, native libraries, and descriptive meta information into the resource adapter.

5. The method of claim 1, wherein the target operational environment is selected from the group consisting of an application server and a Java 2 Platform, Enterprise Edition (J2EE) application.

6. A system to provide a resource adapter that collaborates to provide connections with one of a plurality of application servers and an enterprise information system (EIS), which provides services offered by the EIS, comprising:
    a memory for storing a connector provider and a deployer; and
    a processor for executing the connector provider and the deployer stored in the memory,
    the connector provider including,
        logic for creating the resource adapter, and
        logic for specifying a deployment descriptor in the resource adapter,
    the deployer including logic for deploying the resource adapter into a target operational environment based on properties defined in the deployment descriptor, the deploying including,
        configuring the resource adapter in the target operational environment to create a connection to an instance of the EIS, the connections of the target operational environment being defined between one of the application servers and the EIS.

7. The system of claim 6, wherein the deployment descriptor includes a connector, the connector enabling connections to the EIS.

8. The system of claim 6, wherein the deployment descriptor includes connector contracts between the connector provider and the deployer.

9. The system of claim 6, wherein the deployment descriptor includes declarative information enabling the deployer to deploy the resource adapter into the target operational environment.

10. The system of claim 6, wherein the resource adapter includes interfaces, implementation classes, utility classes, native libraries, and descriptive meta information.

* * * * *